(12) United States Patent
Drinkard et al.

(10) Patent No.: US 9,284,627 B2
(45) Date of Patent: Mar. 15, 2016

(54) PROCESS FOR RECOVERING METAL VALUES FROM OXIDES OF MANGANESE-CONTAINING MATERIALS

(71) Applicant: DRINKARD RESEARCH AND DEVELOPMENT CORPORATION, Charlotte, NC (US)

(72) Inventors: William F. Drinkard, Charlotte, NC (US); Hans J. Woerner, Charlotte, NC (US); William M. Nixon, Charlotte, NC (US)

(73) Assignee: DEEPGREEN ENGINEERING, PTE. LTD., Singapore (SG)

( * ) Notice: Subject to any disclaimer, the term of this patent is extended or adjusted under 35 U.S.C. 154(b) by 0 days.

(21) Appl. No.: 14/397,067

(22) PCT Filed: Oct. 18, 2013

(86) PCT No.: PCT/US2013/065677
§ 371 (c)(1),
(2) Date: Oct. 24, 2014

(87) PCT Pub. No.: WO2014/066169
PCT Pub. Date: May 1, 2014

(65) Prior Publication Data
US 2015/0218672 A1    Aug. 6, 2015

Related U.S. Application Data

(60) Provisional application No. 61/717,160, filed on Oct. 23, 2012.

(51) Int. Cl.
| | | |
|---|---|---|
| *C22B 47/00* | (2006.01) |
| *C22B 7/00* | (2006.01) |
| *C22B 3/06* | (2006.01) |
| *C22B 3/22* | (2006.01) |
| *C22B 3/14* | (2006.01) |
| *C01B 21/20* | (2006.01) |
| *C22B 3/44* | (2006.01) |
| *C22B 3/00* | (2006.01) |
| *C22B 15/00* | (2006.01) |

(52) U.S. Cl.
CPC ............. *C22B 47/0063* (2013.01); *C01B 21/20* (2013.01); *C22B 3/06* (2013.01); *C22B 3/065* (2013.01); *C22B 3/14* (2013.01); *C22B 3/22* (2013.01); *C22B 3/44* (2013.01); *C22B 7/007* (2013.01); *C22B 7/008* (2013.01); *C22B 13/04* (2013.01); *C22B 15/0089* (2013.01); *C22B 17/04* (2013.01); *C22B 23/0461* (2013.01); *C22B 47/00* (2013.01); *C22B 47/0072* (2013.01); *Y02P 10/234* (2015.11)

(58) Field of Classification Search
None
See application file for complete search history.

(56) References Cited

U.S. PATENT DOCUMENTS

2010/0064854 A1 *   3/2010   Drinkard, Jr. .................. 75/430

* cited by examiner

*Primary Examiner* — Steven Bos
(74) *Attorney, Agent, or Firm* — Ralph H. Dougherty

(57) ABSTRACT

An improved method for treating manganese-containing materials, such as nodules recovered by undersea mining, including reacting the materials with ammonia, and leaching with a mineral acid, and to methods for recovering valuable constituents from such nodules, especially manganese, cobalt, nickel, iron, copper, titanium, vanadium, cerium, and molybdenum. A method for the production of nitrate products is also disclosed.

18 Claims, 1 Drawing Sheet

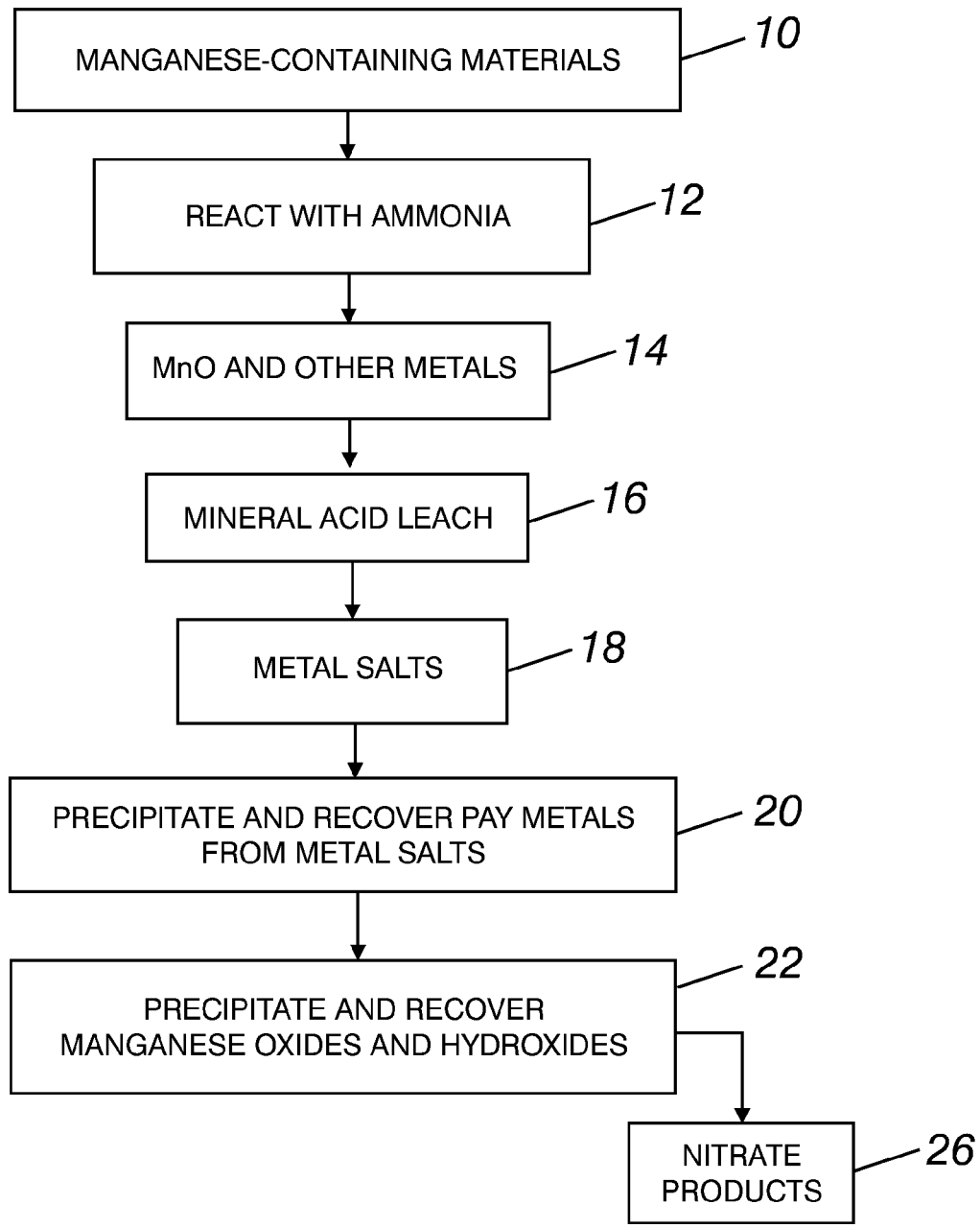

PROCESS FOR RECOVERING METAL VALUES FROM OXIDES OF MANGANESE-CONTAINING MATERIALS

CROSS REFERENCE TO RELATED APPLICATION

This application claims the benefit of priority of PCT Application PCT/US13/65677, filed Oct. 18, 2013, and U.S. Provisional Patent Application Ser. No. 61/717,160, filed Oct. 23, 2012.

FIELD OF THE INVENTION

The present invention relates to a method for treating manganese-containing materials, such as oxides, carbonates, and ores by utilizing an ammonia gas. The invention is well suited to treating polymetallic manganese-containing nodules recovered by undersea mining, and particularly to methods for recovering valuable constituents from such nodules, especially manganese, cobalt, nickel, copper, and iron.

BACKGROUND OF THE INVENTION

Polymetallic or manganese nodules, are rock concretions formed of concentric layers of iron and manganese hydroxides around a core.

Seafloor nodules on the ocean floor include manganese (Mn) in their composition, and usually contain Ni, Co, Cu, Zn, and Fe, with minor amounts of titanium, vanadium, molybdenum, and cerium. Often present in addition are one or more of the following metals: magnesium, aluminum, calcium, cadmium, potassium, sodium, zirconium, titanium, lead, phosphorus, and barium. Deep sea nodules generally contain about 28% Mn, about 10% FeO, about 1% Cu, and about 1.2% Ni.

Most of the desired valuable metals in manganese nodules are tied up with insoluble oxidized manganese, such as $MnO_2$. Less than 10% of the manganese contained in the nodules is acid soluble. Thus it is necessary to reduce the $MnO_2$ by a suitable reducing agent as a first step in order to recover the metal constituents. Historically, $SO_2$ has been used for this purpose, and carbon monoxide (CO) has been used in copper recovery processes. However such prior art processes often do not recover a suitable manganese product and are capable of recovering only from about 80 to about 92% of the primary metal values, and often produce large quantities of waste, which may include metal components that are not completely removed.

SUMMARY OF THE INVENTION

Manganese-containing material treated by the invention can include not only ores or deepsea nodules, but also manganese oxide bearing batteries such as zinc-carbon, alkaline, and lithium (LMO or $LiMn_2O_4$) batteries, or other manganese-containing minerals or materials in any form.

The present invention is a process for recovering manganese, and if present, other metal values ("pay metals") from seafloor manganese containing material including deep sea manganese nodules by treating manganese-containing material with ammonia. Gaseous $NH_3$ reacts with the ore

liberating the trapped desired valuable metals. One ton of $NH_3$ is more effective than 8 tons of $SO_2$.

After reduction of the $MnO_2$ with ammonia gas, any mineral acid can be used to leach and recover the manganese and other metals from the starting manganese-containing materials. Nitric acid is the preferred leach material, because some nitric is formed in the ammonia reaction from the $H_2O$ and $NO_2$.

The present invention is particularly useful for making nitrate products, such as explosives, fertilizer or other nitrates.

OBJECTS OF THE INVENTION

The principal object of the present invention is to provide an improved method of recovering manganese from manganese-bearing materials, including from seafloor manganese nodules.

Another object of the invention is to provide an effective method for recovering metal values from manganese-bearing materials, including, if present, any nickel, cobalt, copper, magnesium, aluminum, iron, calcium, cadmium, potassium, sodium, zirconium, titanium, zinc, lead, cerium, molybdenum, phosphorus, barium, and vanadium.

Another object of the invention is to provide an effective method of recovering other metal values from seafloor manganese-containing materials, including deepsea manganese nodules.

Another object of the invention is to produce nitrate products.

BRIEF DESCRIPTION OF THE DRAWING

The foregoing and other objects will become more readily apparent by referring to the following detailed description and the appended drawing, in which:

The single FIGURE is a diagrammatic flowsheet of a preferred embodiment of the invented process.

DETAILED DESCRIPTION

Referring now to the FIGURE, the process begins with manganese-containing materials 10 such as deepsea manganese nodules, which may be obtained from an ocean, sea, or other body of water. Sometimes such nodules are found in large lakes. The deepsea nodules contain in excess of 20 percent manganese, usually about 28 percent.

In addition to manganese, such deepsea nodules may contain at least one of the following metals: nickel, cobalt, copper, magnesium, aluminum, iron, calcium, cadmium, potassium, sodium, zirconium, titanium, zinc, cerium, molybdenum, phosphorus, barium, lead, and vanadium. The invented process includes the efficient leaching and recovery of many of these metal values.

Optionally, the nodules, or other manganese-containing materials, are crushed or ground to increase the surface area for the later reactions. Advantageously, any chlorides in the nodules are removed by any convenient method, such as washing, preferably with water. This step may be done before, during or after any crushing but preferably after.

The nodules are reacted at elevated temperature with ammonia at 12. Gaseous $NH_3$ reacts with the manganese oxide ore according to the following equation:

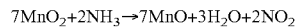

The $NH_3$ reacts with $MnO_2$ to form MnO, water, and $NO_2$, and to release the other metals from the nodules at step 14. The $NO_2$ can be removed as a gas or reacted to form nitric acid.

After reduction of the $MnO_2$ with ammonia, any mineral acid can be used in the leach step 16 to leach and recover the manganese and other metal salts 18 from the starting manganese-containing materials. Nitric acid is the preferred leach material, because some nitric is formed in the ammonia reaction.

Pay metals are precipitated and recovered at 20 from metal salts formed in the leaching step. Following the leach, the pH of the solution is then changed to about 2.2-2.3 to precipitate hydrated iron oxide ($FeOOH.H_2O$). The precipitated iron values are removed by filtration of the solution. This pH change may be achieved in various ways, including the addition to the solution of ammonia or alkaline earth hydroxides, such as $Mg(OH)_2$ or $Ca(OH)_2$, alkaline earth oxides such as MgO or CaO, or alkaline earth carbonates such as $Mg(CO_3)_2$ or $Ca(CO_3)_2$.

Any copper, lead, cadmium, and zinc present in the solution is also removed therefrom. Once in solution the metal values may be precipitated as oxides or sulfides. Preferably, the solution is adjusted to a low pH, hydrogen sulfide ($H_2S$) or NaHS is introduced into the solution to precipitate as sulfides any copper, lead, cadmium, and zinc which is present in the solution, and the precipitated metal values are removed by filtration.

The pH of the solution is then raised, hydrogen sulfide or NaHS is again added to the solution to precipitate cobalt and nickel as sulfides. Aluminum and some remaining zinc may also be precipitated as sulfides in this step.

Preferably, the pH of the solution is then raised to about 9 to precipitate and recover manganese oxides and hydroxides at 22. After filtering the residue, the remaining solution is a nitrate product 26 which can be used as fertilizer, or as a source of nitrates for reuse in the process.

ALTERNATIVE EMBODIMENTS

Alternatively, the manganese-containing material can be derived from industrial waste or chemical processing, or ores from land mining operations, which ores contain manganese, or manganese-containing materials resulting from processing such ores. The manganese-containing materials can be obtained by the prior chemical or metallurgical treatment of polymetallic nodules obtained from any body of water.

Either the $NH_3$ or the manganese-containing material, or both, may be heated to enhance the reaction. Further, liquid ammonia may be used in the process, but gaseous ammonia is preferred.

SUMMARY OF THE ACHIEVEMENT OF THE OBJECTS OF THE INVENTION

From the foregoing, it is readily apparent that we have invented an improved method for treating manganese-containing material including the treatment of seafloor manganese nodules recovered by undersea mining, to effectively react the material with ammonia to produce a manganese oxide product and release any valuable metals, and for recovering the metal values contained in the nodules efficiently. We have also invented an improved method of recovering manganese from manganese-bearing materials, including recovering other metal values from manganese-bearing materials, such metal values including, if present, nickel, cobalt, copper, magnesium, aluminum, iron, calcium, cadmium, potassium, sodium, zirconium, titanium, zinc, lead, cerium, molybdenum, phosphorus, barium, and vanadium; as well as an effective method of recovering metal values from seafloor manganese-containing materials including deepsea manganese nodules, and for producing a nitrate product.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A method of recovering metal values from manganese-containing materials, comprising the steps of:
   a. obtaining manganese-containing materials also containing other metals;
   b. reacting the manganese-containing materials with $NH_3$ to form MnO and to release the other metals, and forming a solution;
   c. leaching the reacted materials with a mineral acid to form metal salts,
   d. precipitating and recovering other metals from the metal salts; and
   e. precipitating and recovering manganese oxides and hydroxides.

2. A method according to claim 1 wherein the manganese-containing materials are polymetallic nodules obtained from any body of water.

3. A method according to claim 2 wherein the manganese-containing materials are deep-sea manganese nodules.

4. A method according to claim 1 wherein the manganese-containing materials are manganese-containing nodules recovered by undersea mining.

5. A method according to claim 1 wherein the manganese-containing materials are obtained by the chemical or metallurgical treatment of polymetallic nodules obtained from any body of water.

6. A method according to claim 5, further comprising crushing or grinding the nodules.

7. A method according to claim 1, further comprising removing chlorides from the manganese-containing materials by washing the materials.

8. A method according to claim 1 wherein step b is carried out at elevated temperature.

9. A method according to claim 1 wherein said manganese-containing materials also contain at least one of the metals of the group consisting of: nickel, cobalt, iron, copper, magnesium, aluminum, calcium, cadmium, potassium, sodium, zirconium, titanium, zinc, lead, cerium, molybdenum, phosphorus, barium, and vanadium, said method further comprising:
   a. adding alkaline earth oxides, hydroxides, or carbonates to the solution to precipitate any iron as ferric hydroxide residue;
   b. filtering the residue from the solution;
   c. precipitating any copper, lead, and cadmium present in the solution as sulfides; and
   d. precipitating any cobalt and nickel sulfides, leaving alkaline earth salts.

10. A method according to claim 9 wherein precipitation of any copper, lead, or cadmium from the solution is accomplished by adjusting the solution to a low pH and introducing $H_2S$ and NaHS to the solution, and forming sulfides.

11. A method according to claim 9, wherein precipitation of cobalt and nickel sulfides is carried out by raising the pH of the solution and introducing additional $H_2S$ or NaHS thereto.

12. A method according to claim 1, wherein precipitation of manganese oxides and hydroxides is carried out by raising the solution pH to about 9.

13. A method according to claim 1 wherein said manganese-containing materials also contain iron, said method further comprising:
   a. adding alkaline earth oxides, hydroxides, or carbonates to the solution to precipitate ferric hydroxide residue; and
   b. filtering the residue from the solution.

14. A method according to claim 1 wherein said manganese-containing materials also contain copper, lead, and cadmium, said method further comprising precipitating copper, lead, and cadmium present in the solution as sulfides.

15. A method according to claim 1 wherein said manganese-containing materials also contain cobalt and nickel, said method further comprising the step of precipitating cobalt and nickel sulfides, leaving alkaline earth salts.

16. A method of producing a nitrate product from manganese-containing materials, comprising the steps of:
   a. obtaining manganese-containing materials also containing other metals;
   b. reacting the manganese-containing materials with $NH_3$ to form MnO and to release the other metals, and forming a solution;
   c. leaching the reacted materials with a nitric acid to form metal nitrates;
   d. precipitating and recovering other metals from the metal nitrates; and
   e. precipitating and recovering manganese oxides and hydroxides, leaving a nitrate product.

17. A method according to claim 16 wherein said nitrate product is a recyclable nitrate.

18. A method according to claim 16 wherein said nitrate product is a fertilizer product.

* * * * *